Sept. 14, 1954    J. KANTOR ET AL    2,689,057
CONTAINER HANDLER FOR LABEL AFFIXING MACHINES
Filed Aug. 17, 1951    4 Sheets-Sheet 1

INVENTORS.
JAMES KANTOR.
EDWARD ROSENBERG.
BY ADRIAN C. SMALL.

Lockwood, Hahn, Galt & Woodard.
ATTORNEYS.

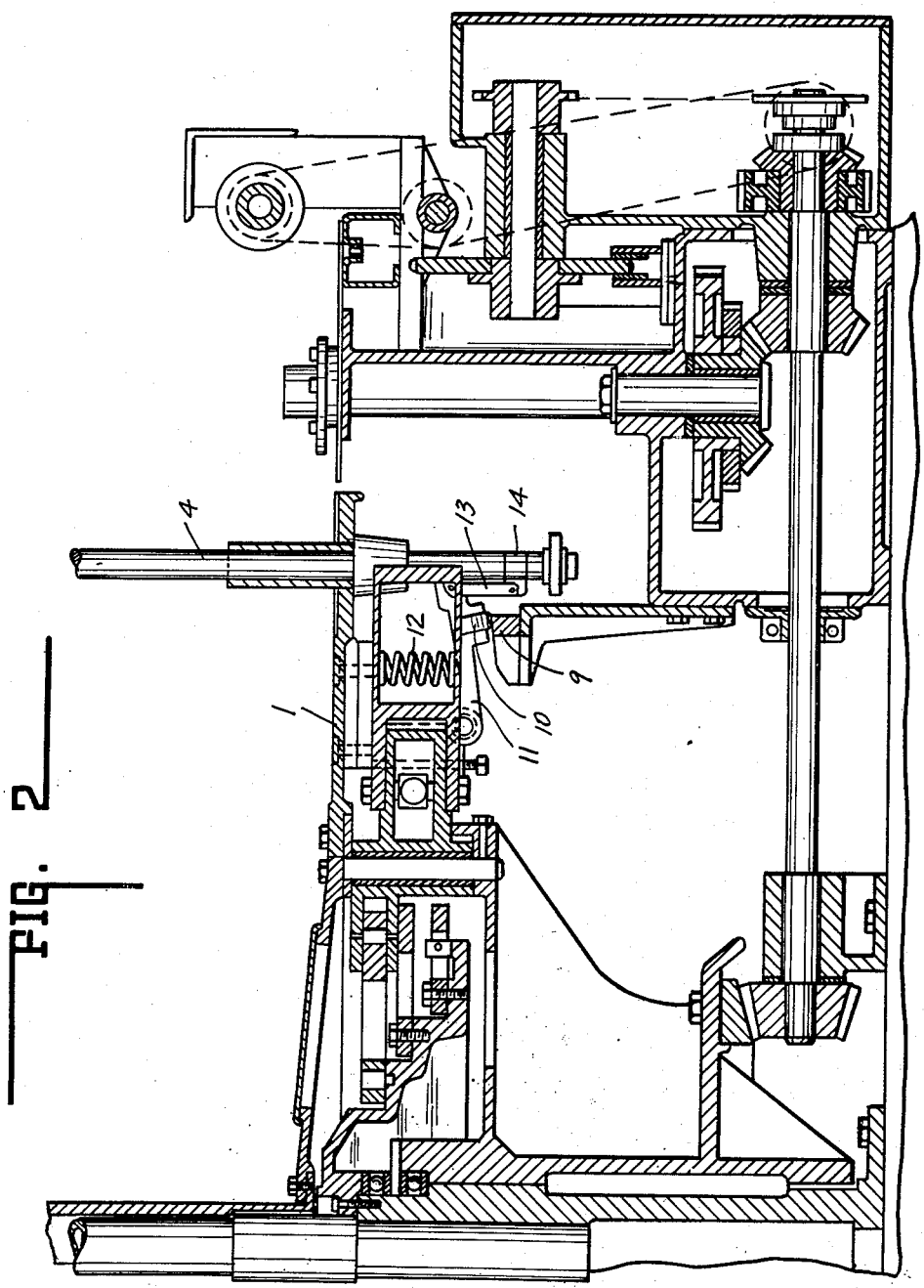

Sept. 14, 1954   J. KANTOR ET AL   2,689,057
CONTAINER HANDLER FOR LABEL AFFIXING MACHINES
Filed Aug. 17, 1951   4 Sheets-Sheet 3
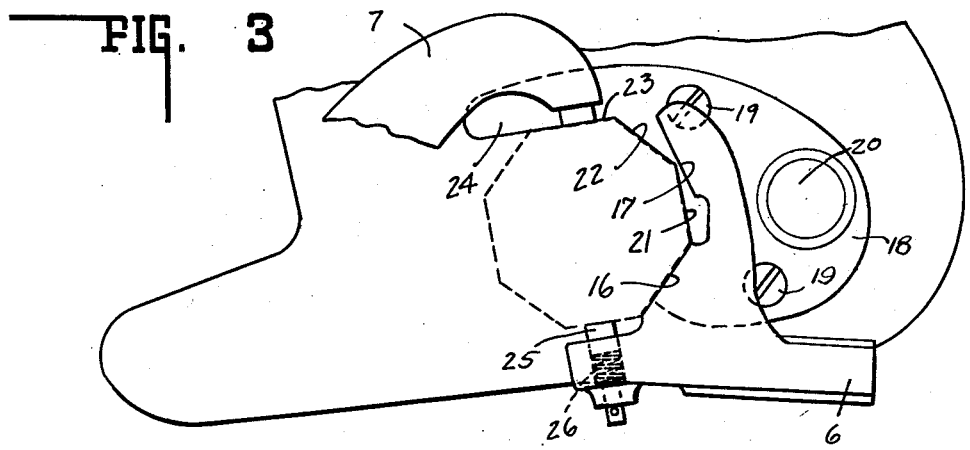
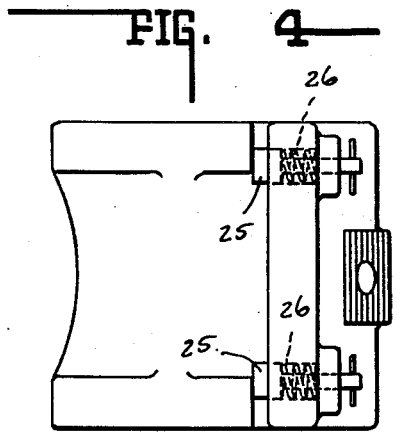
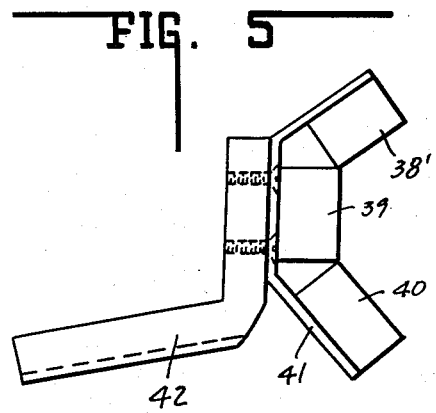
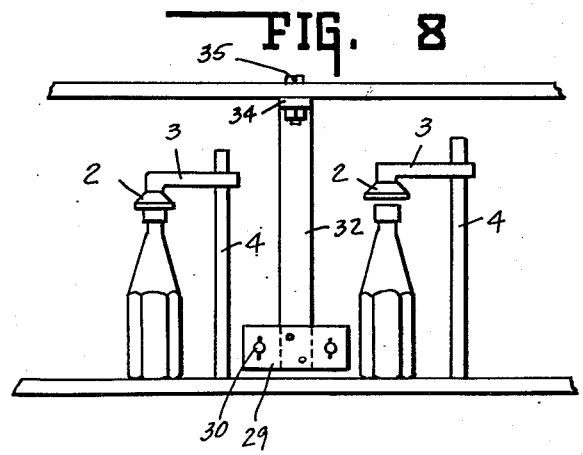
INVENTORS.
JAMES KANTOR.
EDWARD ROSENBERG.
BY ADRIAN C. SMALL.
Lockwood, Hahn, Galt & Woodard
ATTORNEYS.

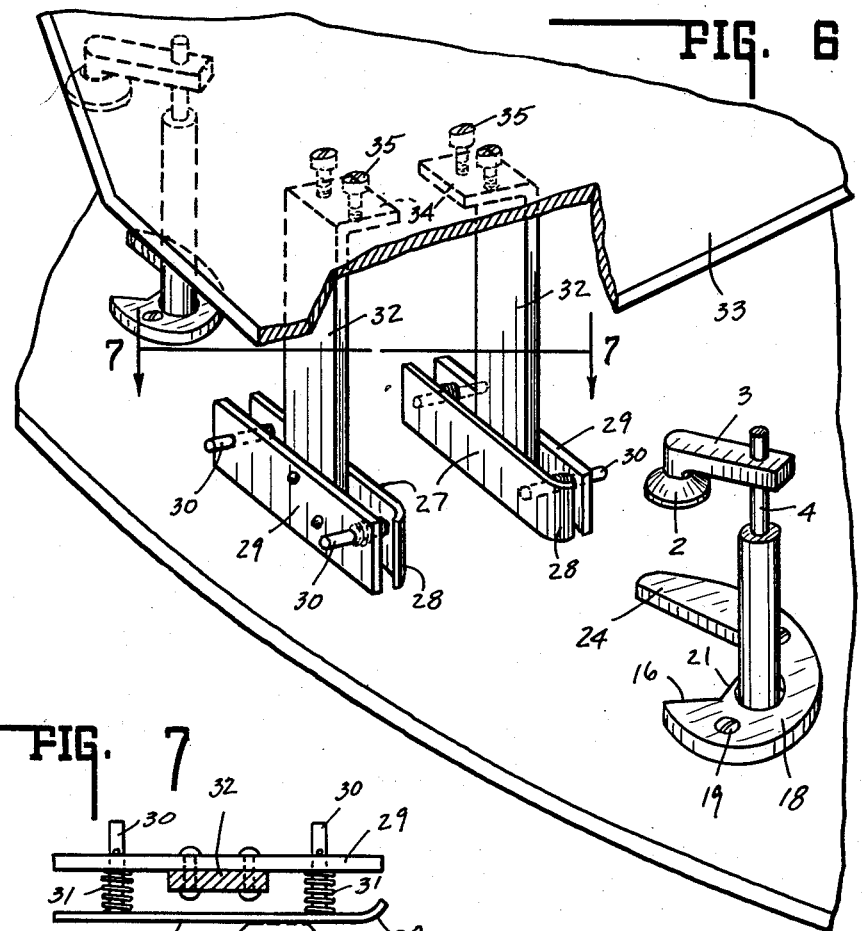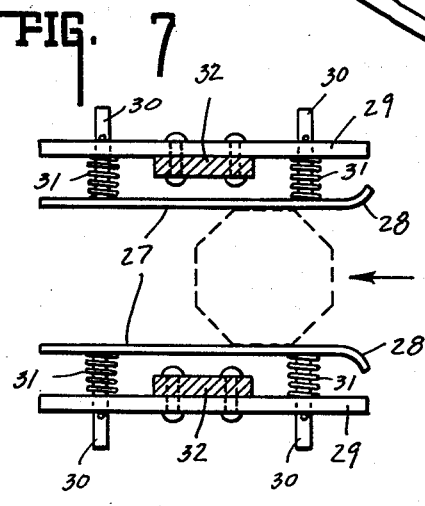

Patented Sept. 14, 1954

2,689,057

UNITED STATES PATENT OFFICE 2,689,057

CONTAINER HANDLER FOR LABEL AFFIXING MACHINES

James Kantor, Edward Rosenberg, and Adrian C. Small, Chicago, Ill., assignors to The Liquid Carbonic Corporation, Chicago, Ill., a corporation Application August 17, 1951, Serial No. 242,252

2 Claims. (Cl. 216—54)

The present invention relates to an apparatus for applying labels to containers, and particularly to containers of the bottle and can type.

More specifically the present invention relates to the means for positioning the containers to receive the labels from the label applying machine.

The present invention is a continuation in part of our copending application filed March 17, 1948, for Label Affixing Machine for Containers, bearing the Serial No. 15,358, Patent No. 2,618,397, granted November 18, 1952.

In that application there is disclosed a means for receiving the containers to which the labels are to be attached and presenting the same to the label affixing mechanism, the containers thereafter being adapted to pass through a suitable mechanism for smoothing the labels in position after they have been once applied to the containers.

In one embodiment of said machine there is disclosed a means for handling octagonal or irregularly shaped bottles. In this type of machine, particularly of the type disclosed in the above mentioned application, the bottles have to be very accurately positioned on the receiving table before they are presented to the labelling mechanism in order that the label will be accurately placed on the container or bottle.

The present application is directed toward that feature of the machine for accurately positioning irregularly shaped bottles or containers, and particularly octagonally shaped bottles or containers, so that they will be properly presented to the label affixing mechanism.

For the purpose of disclosing the invention an embodiment is disclosed in the accompanying drawings in which Fig. 1 is a partial plan view, partially diagrammatic, of the rotating container supporting table and associated parts.

Fig. 2 is a longitudinal sectional view showing the drive mechanism, the container supporting table and the operating means for the container grippers.

Fig. 3 is a plan view of holding fingers for the infeed star, together with the bottle aligning block for receiving the bottle on the moving table.

Fig. 4 is a front elevation thereof.

Fig. 5 is a plan view of a modified form of holding finger for the outfeed star.

Fig. 6 is a perspective view showing the bottle aligning means adapted to cooperate with the positioning means shown in Fig. 3, and Fig. 7 is a sectional view on line 7—7 of Fig. 6.

Fig. 8 is a side elevation showing the aligning means and its associated bottle clamps.

Figure 1:
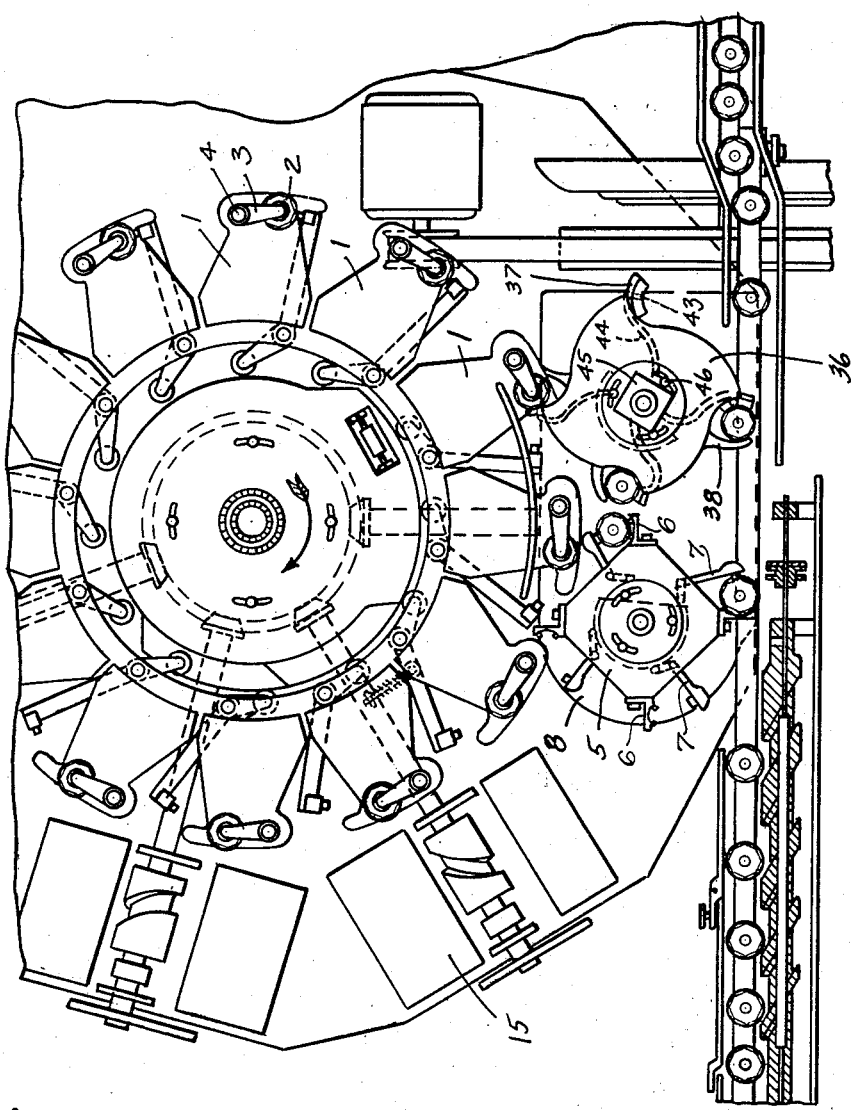

In the apparatus illustrated we provide a rotary table or support carrying a plurality of container supporting platforms 1. Each of these platforms is adapted to receive a bottle which is gripped at its top by a top gripper 2 carried on a gripper arm 3, which in turn is supported on a support rod 4 (Fig. 2). As the bottle receiving table and platform 1 rotate in a clockwise direction, each table receives a bottle from an infeed star 5. This star is similar to that shown in U. S. Patent No. 2,330,430, granted September 28, 1943, and is provided with a plurality of gripper fingers. One finger 6 of each of the pairs is relatively stationary on the star 5, and the other finger 7 of each of the pairs is adapted to move relatively to the finger 6, after the finger 6 has engaged and removed from the bottle conveyor a single bottle. With the bottles gripped between the fingers 6 and 7 the bottle is moved across the table 8, which is located adjacent to the delivery and removal conveyors and wholly positioned on a supporting platform 1 beneath an open gripper 2, which under predetermined conditions descends and engages the top of the bottle maintaining the same substantially rigid on the supporting platform.

The operating rod 4 for the gripper is raised to non-gripping position and lowered to gripping position through the medium of a cam 9 (Fig. 2) on which rides a roller 10 carried by an arm 11 pivoted on the supporting table platform structure 1 and biased in a downward direction through the medium of a coiled spring 12. The free end of this arm 11 is connected by a link 13 with a collar 14 on the lower end of the rod 4. Accordingly, as each of the platforms 1 rotates, each of the grip operating rods 4 will be raised to open position to permit the gripper to receive a bottle and after receiving a bottle, which has been properly positioned on the platform, moved downwardly under the influence of the coiled spring 12 to grip the bottle and maintain the same in position.

After the bottle has been gripped on its supporting platform 1 in its proper position, it is moved in a position to have applied thereto labels through a suitable label affixing mechanism indicated generally as at 15.

For the purpose of this description a detail description of the label picker and affixing mechanisms is believed to be unnecessary as reference may be had to said copending application for the full description of the operation of applying the labels to the container or bottle.

In view of the fact that it is essential, where octagonal bottles are adapted to be labelled, the bottles must be accurately positioned on the table we have provided a gripper finger corresponding to the gripper finger 6, which has a flat face 16 and a second flat face 17 so disposed that when the bottle is received by the gripper finger 6, it will be properly positioned to be placed on the table with a flat surface of the bottle resting against the flat surface 16. Cooperating with the finger 6 and its flattened positioning surfaces 16 and 17 is a positioning pad or block 18 which is secured on the top face of each of the tables or platforms by suitable bolts or screws 19. This pad or block is provided with opening 20 through which the gripper supporting rod 4 is adapted to pass. On the receiving face of this block there is provided a plurality of flat faces 21, 22 and 23 which are so disposed as to form a pocket having one elongated side 24 into which the octagonal bottle is moved by the transfer finger and its associated gripper finger 7. As a result of this arrangement, bearing in mind that the table 1 and the infeed star are rotating tangentially by the time the gripper finger 7 has reached a position to deposit a bottle in its positioning pad 18, the movable finger 7 will have moved out of engagement with the bottle; and spring fingers or plungers 25 biased in projecting position by the coiled springs 26 and carried on the gripper finger 6 will force the bottle into the pocket formed by the faces 22 and 23 so that the bottle will be properly positioned on the platform or table 1 to be passed through the label applying mechanism.

It has been found in practice that while the above arrangement is satisfactory for the positioning of the bottle on the platform or table 1, due to the fact that the pad 18 is comparatively low in height there is some danger of the bottle becoming slightly twisted or not securely placed in position before the gripping finger or clamp 2 descends to clamp the bottle in position on the table. To prevent any such twisting on the part of the bottle while in the positioning pad 18, we further insure the proper location of the bottle by means of guides between which the bottle passes so that two parallel panels are engaged by these guides shortly before the top gripper or gripper finger 3 descends to clamp the bottle in position. A pair of these guides 27 suitably spaced apart and between which the bottle passes are elongated having their intake ends curved as at 28 to provide intake throats and are elongated so that the bottle will pass for a short distance between the same to insure straightening the bottle. Each of the guides is mounted on a cross bar 29 through the medium of supporting pins 30, and interposed between the back face of the guide and the cross bar 29 and surrounding the pins 30 are coiled springs 31 biasing the guides in a projected position. Each of the cross bars 29 is carried on the lower end of the depending arm 32 secured to a top cover plate 33, which is stationarily mounted on supporting rods extending upwardly from the base of the machine (not shown). The supporting arms 32 have inturned ends such as 34 into which are fastened securing screws 35 for supporting the supports in position. Accordingly, as the bottle or container moves with the table 1, having been initially positioned by the positioning pad 18, it passes between the guides 27, which engaging the flat sides of the bottle insure its being retained in this position; and after having passed through these guides, the top gripper 2, through the action of the cam 9 and the spring 12, descends and firmly grips the bottle in its correct position.

After having been so positioned, the bottle will be passed through the labelling mechanism; and the label, of course with the bottle positioned correctly, will be properly applied.

After the label has been applied to the bottle, the table 1 in its rotating movement is brought opposite the outfeed star 36 and delivered to the conveyor for transfer away from the machine. This star is provided with a plurality of pairs of fingers; one finger 37 of each pair may take the form illustrated in Fig. 5 while the other finger 38 is movable to open to receive the bottle and to close to grip the bottle during the transfer from the supporting table 1 to the conveyor. This gripper finger 37 preferably consists of a plurality of sponge rubber, or other material of like character, blocks or pads 38, 39 and 40 (Fig. 6), which are maintained in an angular relation to one another by a bracket 41 secured to a supporting finger 42. Accordingly, when the bottle is deposited in position and pressed by the movable finger 38 against the pads 37, 38', 39 and 40 the label will be pressed and ironed smoothly in position.

In applying the label to the container or bottle it sometimes happens that a certain proportion of the glue on the label squeezes out beneath the same, and as a result the front face of the label may have adhering to it a certain amount of glue. This glue during the movement of the bottle through the machine is apt to become tacky, and as a result the label might stick to the pad 37 of the outfeed star. To avoid this contingency, the pad is provided with one or more perforations 43 extending through the pad from the rear face. These perforations are connected by feeder pipes or conduits 44 with a liquid supply tank 45 mounted on the top of the shaft of the outfeed star 36 so that a constant drip of water from the tank may be fed to the front face of the pad, moistening the same and preventing any glue which may be on the front face of the label becoming so tacky as to cause the label to adhere to the pad and pull off of the bottle. The drip of the water may be controlled by suitable valves 46, one for each of the pipes 44.

The invention claimed is:

1. A container feeding means for octagonal containers comprising a rotary table, means for depositing a container in predetermined position on said table, an outfeed star for removing a container from said table comprising a rotary table supporting member, a substantially arcuate relatively stationary container engaging finger mounted on said supporting member, a substantially arcuate container engaging pad formed of resilient material mounted on said finger, means for depositing a liquid film on the container engaging face of said pad, and a movable container engaging finger mounted on said supporting member and movable to force a container against said resilient pad.

2. A container feeding means for octagonal containers comprising a rotary table, means for depositing a container in a predetermined position on said table, means for applying adhesive coated labels to a side of said container, an outfeed star for removing a container from said table comprising a rotary table supporting member, a substantially arcuate relatively stationary container engaging finger mounted on said supporting member, a substantially arcuate container engaging pad formed of resilient material mounted on said finger, means for depositing a liquid film on the container engaging face of said pad, and a movable container engaging finger mounted on said supporting member and movable to force a container against said resilient pad.

References Cited in the file of this patent

UNITED STATES PATENTS

| Number | Name | Date |
| --- | --- | --- |
| 1,197,569 | Woodland | Sept. 5, 1916 |
| 1,226,997 | Peters et al. | May 22, 1917 |
| 1,238,713 | Johnson et al. | Aug. 28, 1917 |
| 1,253,250 | Johnson | Jan. 15, 1918 |
| 1,292,997 | Becker | Feb. 4, 1919 |
| 1,574,307 | Risser | Feb. 23, 1926 |
| 1,849,548 | Oslund | Mar. 15, 1932 |
| 2,259,212 | Oslund | Oct. 14, 1941 |
| 2,308,154 | Carter | Jan. 12, 1943 |
| 2,524,700 | Grant | Oct. 3, 1950 |
| 2,528,860 | Clark | Nov. 7, 1950 |
| 2,544,627 | Amidon et al. | Mar. 6, 1951 |
| 2,570,198 | Brager | Oct. 9, 1951 |